Figure 1:
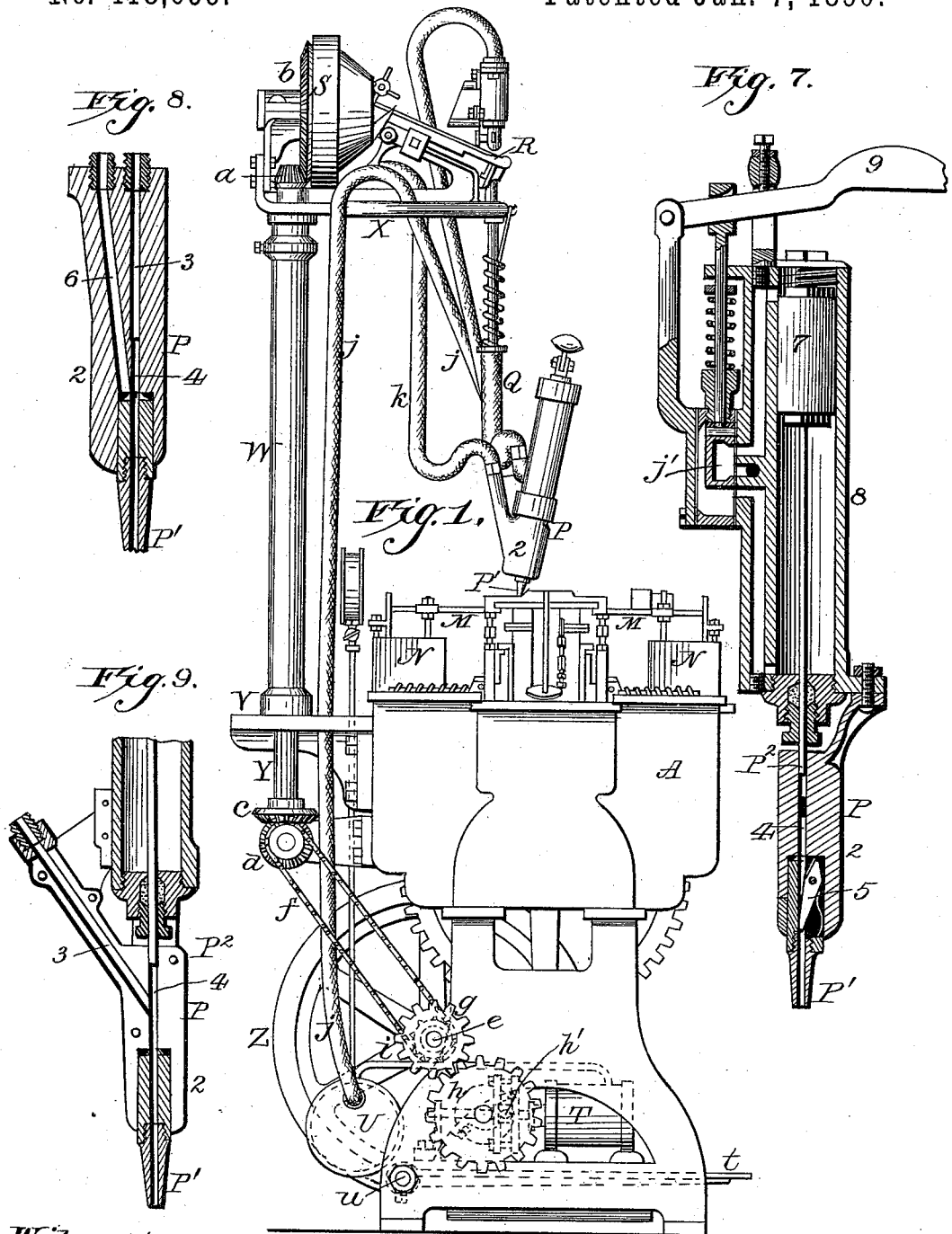

(No Model.) 4 Sheets—Sheet 1.

H. W. DEAN.
LASTING MACHINE.

No. 418,699. Patented Jan. 7, 1890.

Witnesses:
T. C. Brecht
Howell Bartle

Inventor:
Henry W. Dean
By Johnson & Johnson
his Attorneys (No Model.) 4 Sheets—Sheet 4.

H. W. DEAN.
LASTING MACHINE.

No. 418,699. Patented Jan. 7, 1890.

Witnesses:
Inventor:

UNITED STATES PATENT OFFICE.

HENRY W. DEAN, OF NORRISTOWN, ASSIGNOR OF PART TO JOHN MUNDELL, OF PHILADELPHIA, PENNSYLVANIA, SIMON A. BUTLER, OF BOSTON, AND EMMA F. LOTHROP AND JOSEPH HERBERT BOWEN, BOTH OF LYNN, MASSACHUSETTS.

LASTING-MACHINE.

SPECIFICATION forming part of Letters Patent No. 418,699, dated January 7, 1890.

Application filed August 29, 1889. Serial No. 322,284. (No model.)

*To all whom it may concern:*

Be it known that I, HENRY WELLINGTON DEAN, a citizen of the United States, residing at Norristown, in the county of Montgomery and State of Pennsylvania, have invented new and useful Improvements in Combined Lasting and Tacking Machines, of which the following is a specification.

In an application for a patent executed by me December 21, 1888, for improvements in lasting-machines, I have shown, described, and claimed certain automatically-operating mechanisms or devices and combinations of mechanisms or devices which go to make a lasting-machine adapted for hand-tacking, and in which the operator by his foot so controls a treadle-stop and releasing mechanism as to cause the lasting mechanism to operate in succession in its various functions of properly placing and holding the shoe-upper upon the last for the operator to place and to drive the tacks by his hands, and then by his foot and treadle connections to effect the release of the lasting mechanisms in the same successive order in which they were brought into action.

In an application for a patent executed by me December 21, 1888, I have shown, described, and claimed certain mechanisms or devices and combinations of mechanisms or devices which go to produce a pneumatic tacking-machine, in which a tack-driving head is suspended by a flexible tack-feeding tube from a horizontal swinging tack-feeding head for universal movement in the hands of the operator for use with a lasting-jack, and in which the operator by his hands controls both the placing and the driving of the tack by moving the tack-driving head and releasing the air under compression as the driving-power.

The expense of separate operators and power attachments for these separate and distinct machines I found to be an important disadvantage in an economic sense, and to overcome this serious objection to the expense of separate machines I have combined these two separate and distinct machines in one organization compact and complete for lasting and for tacking the shoe expeditiously, and by one operator controlling the lasting mechanisms of the machine by his foot and the tacking mechanism of the machine by his hands, the combined machine being operated by one power-driven shaft. In the new machine which I have thus produced the pneumatic tack-driving part thereof is mounted upon the rear side of the frame of the lasting part thereof, so that the suspended universally-movable tack-driving head will be supported in position centrally over the top of the lasting part, so as to be conveniently manipulated directly over and around the lasted shoe while tacking the upper to the inner sole.

In my new machine the power-driven shaft operates the lasting mechanisms or devices, the air-pump, and the tack-feeding mechanisms or devices, and the operation of these several things is controlled in harmony and co-operation by means of a treadle stopping and starting mechanism and a suitable clutch-connection with the driven pulley.

The importance and utility of my invention are enhanced to the extent of saving the expense of one operator; of doing the work of the two separate machines in about half the time, thereby greatly increasing the profit of the single machine over the independent machines.

My new machine saves the room which would be occupied by a separate machine, and also saves the expense of the power which would be required to operate said separate machine.

My new machine also saves the expense of the separate base-frame which would be necessary for the pneumatic tacker in its use as an independent machine.

In my new machine the power-driven shaft constantly operates to supply and store the power which serves to drive the tacks, while at the same time it is connected with and serves to operate the lasting mechanism, so that the operation of the machine is thereby rendered practically continuous in the separate branches of the work to produce a unitary result, in which the several parts are arranged to operate in positions convenient for the eyes, the hands, and the feet of the operator to subserve a common end, in which the operation of all the parts tends to bring the two machines together to produce a result which they could not accomplish by their independent and disconnected action. In this new combination I have made the operative relation of the tacking part of the machine to the lasting part and the manner of connecting the two parts to the power from which both are placed under the control of one operator convenient and compact as a single merchantable article of manufacture.

The accompanying drawings illustrate my new tacker and laster as a combined machine, and as these machines, separately considered, are described and shown as to their separate structure, organization, and operation in my said application, it is deemed only necessary to exhibit so much of these machines as shows my invention in their combination and the means which effect their co-operation, in the continuous operation of which the operator uses his foot to control one part of such continuous operation and his hands to control the other part of such continuous operation effected from one shaft which connects both.

Figure 2:
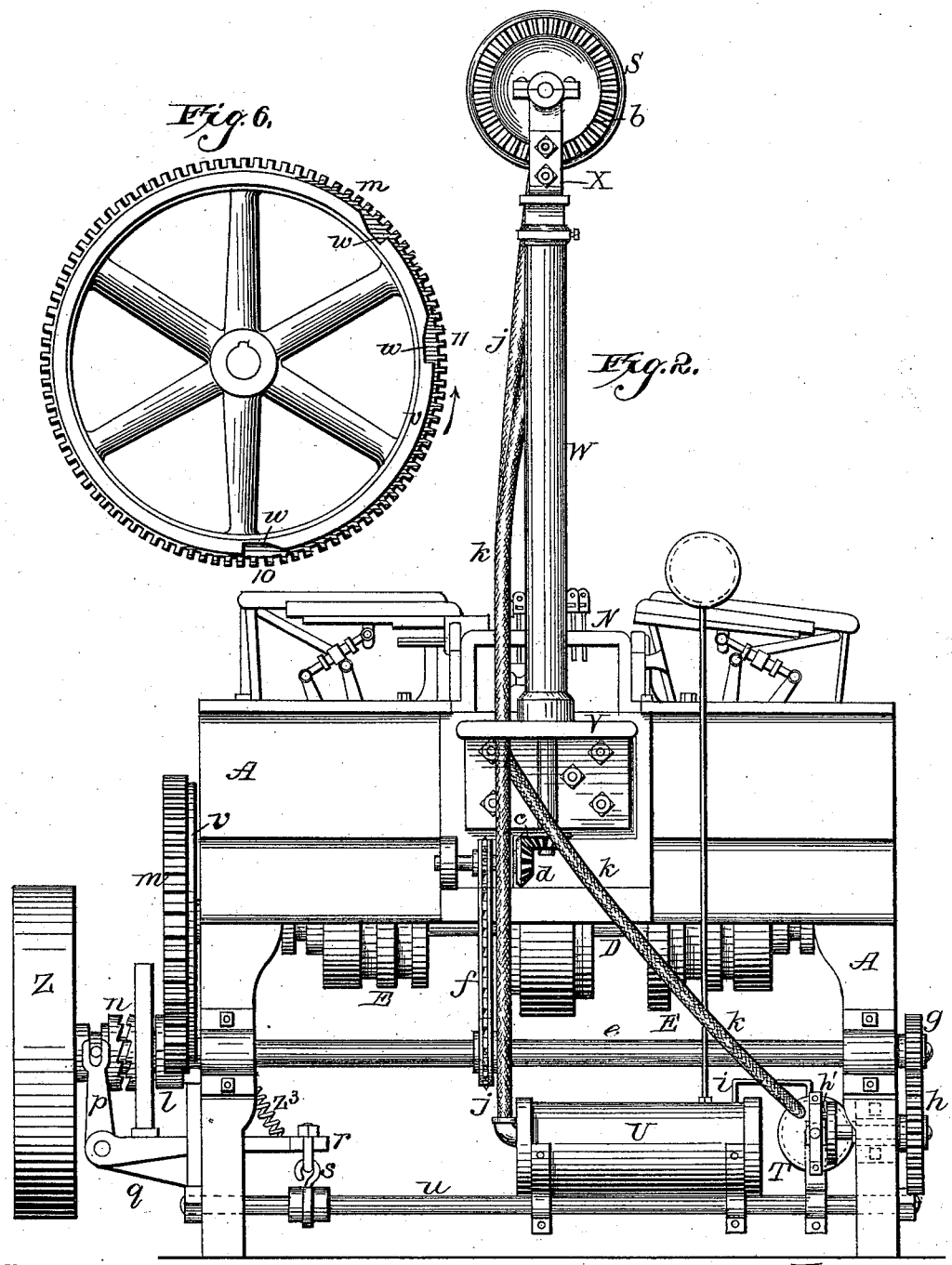
Figure 3:
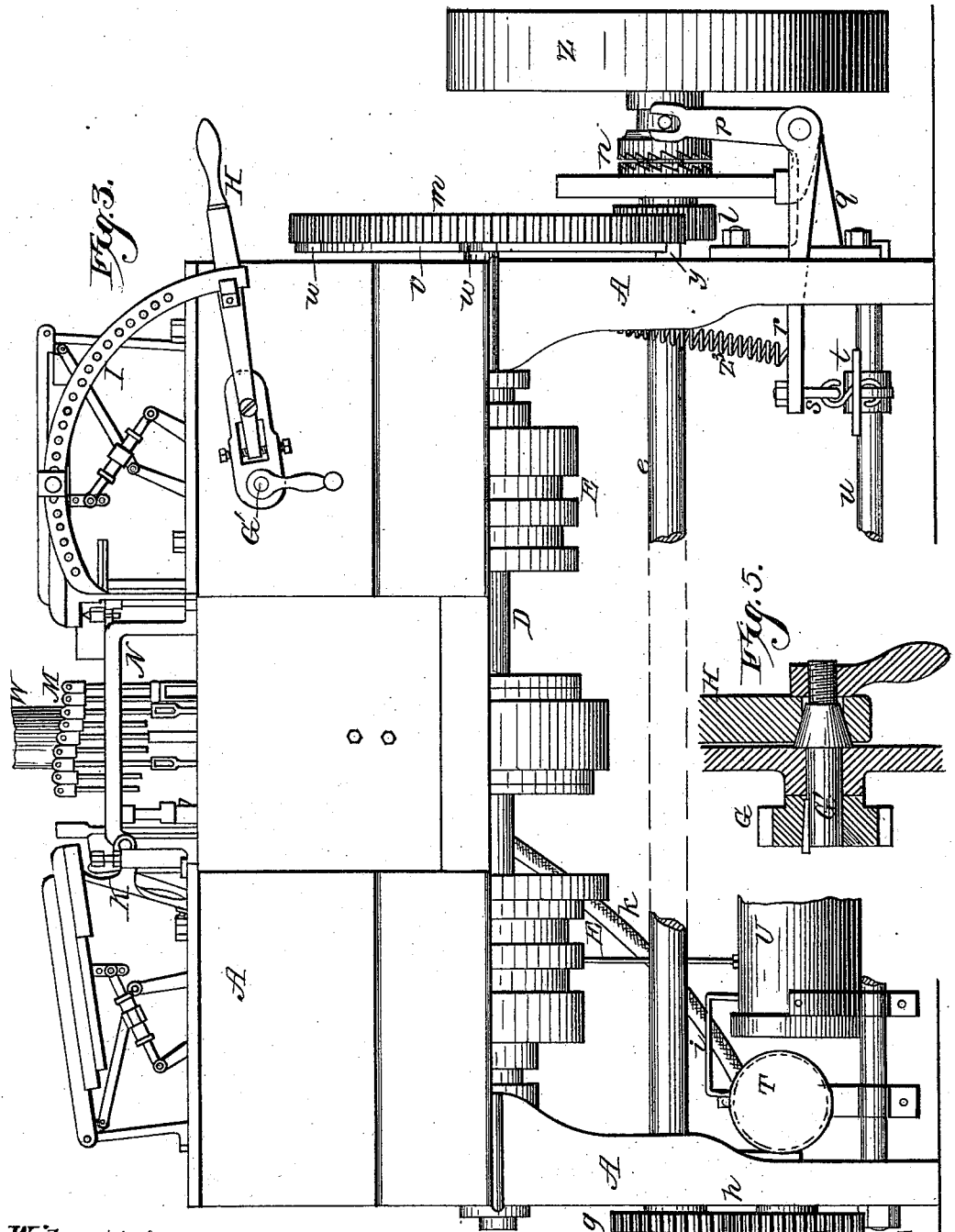
Figure 4:
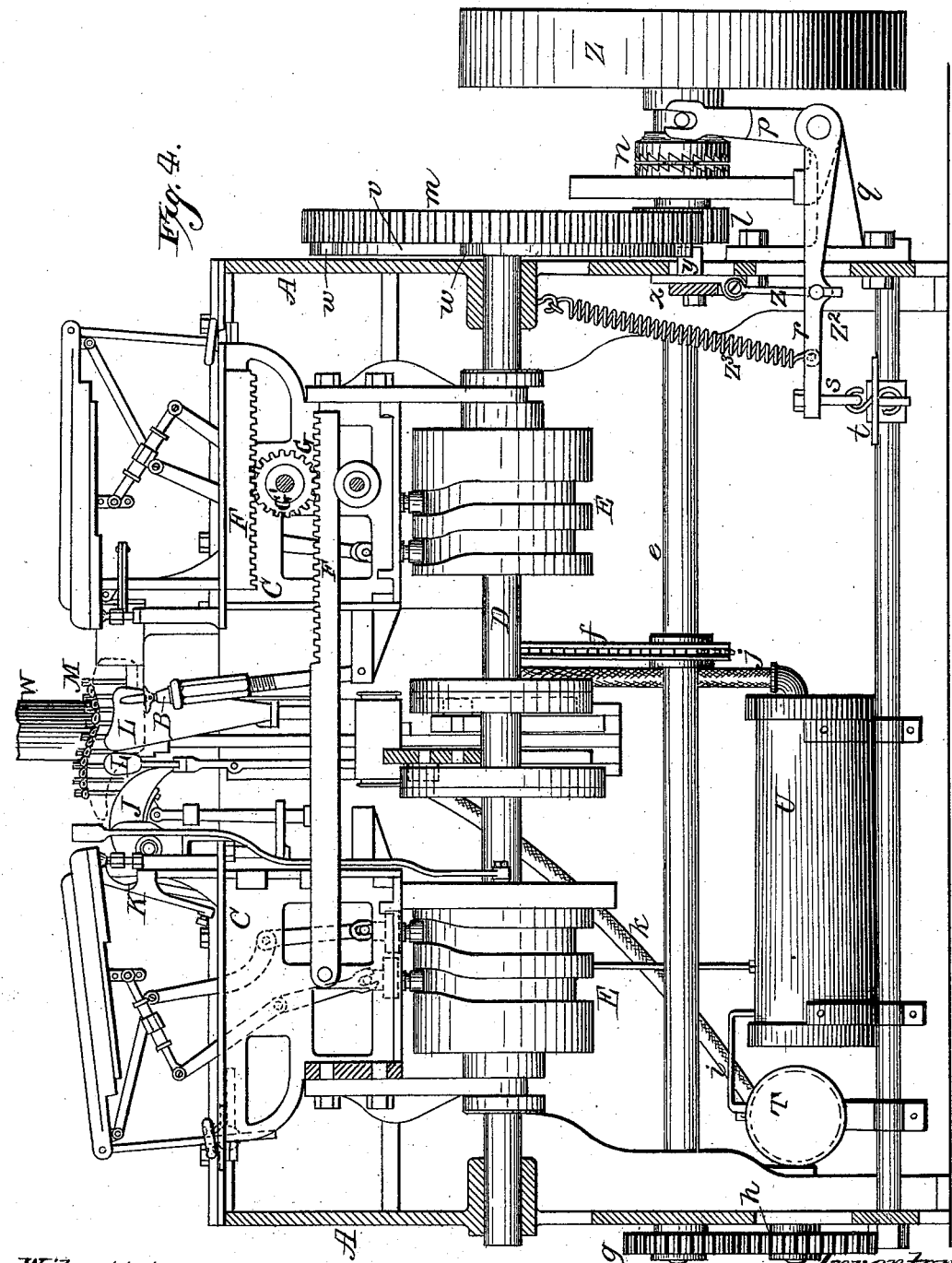

Referring to the drawings, Figure 1 is an end elevation of my combined automatically-operated lasting and pneumatic tacking-machine. Fig. 2 is a rear elevation of the same. Fig. 3 is a front elevation of the lower portion of the machine, and Fig. 4 is a partly sectional front elevation of the same. Fig. 5 shows a sectional detail view of the connection of the hand-lever with the gear that engages the rack which operates the heel and toe clamping carriages of the lasting part of the machine. Fig. 6 shows the gear-wheel on the end of the cam-shaft to particularly illustrate the notched annular rim that engages with the stop-dog device of the treadle-connections of the machine. Fig. 7 is a vertical central section of the pneumatic tack-driving head, showing the hand-valve-controlled tack-driving pin. Fig. 8 is a vertical section of the hand-holding part of the exhaust-passage; and Fig. 9 is a vertical central section of the hand part of the tack-driving head, showing the tack-passage junction with the tack-driver passage.

A suitable frame A is constructed of such form and size as will support the working parts of the combined machine.

Referring to the lasting part of the machine, it will be understood that any suitable automatically-lasting devices or mechanisms may be used, but I prefer to use those shown and described in my said application, and which it is deemed unnecessary to show or describe in detail herein.

Referring to the tacking part of the machine, it will be understood that any suitable pneumatic tacking device or mechanism may be employed, so long as it has a universally-movable tack-driving head suspended centrally over the lasting part of the machine, and is operated by the same power and is controlled by the same operator in the organized machine.

Considering, therefore, the lasting part of the machine and the automatic operating and controlling mechanism therefor, let B, Fig. 4, designate the jack for supporting the last, and C C the heel and the toe clamping carriages, which may be provided with any suitable clamping and crimping mechanism.

D is the cam shaft, and E E are cams splined thereon, of like construction, but formed as rights and lefts and adapted to slide freely upon said shaft, to rotate with it, and to operate, respectively, the toe and heel clamping mechanisms, as in my said application.

The heel and toe clamping carriages are mounted in suitable guides at the top of the frame, and are operated toward and from the last by means of rack-bars F F, attached one to each carriage and arranged to engage with a pinion G, secured upon a stud G', rotatingly mounted in bearings in the side wall of the machine, as seen in Figs. 3 and 5. This pinion is operated by a hand-lever H, so as to give a uniform reciprocating movement in opposite directions to the rack-bars and through them to the carriages to carry the heel and the toe clamps toward and from the last. Provision is made for locking said clamps upon the last by means of a gage I, secured upon the frame in the path of the said hand-lever, which latter, for this purpose, is provided with a spring-catch.

J is a toe-rest, and K is a pivoted toe-clamp. L are the side wipers, and M are the side lasting-fingers, which are mounted upon side carriages N. All these lasting parts in their construction and connection are operated by cams on the cam-shaft, as set forth in my said application.

The form and disposition of the cams are such as to automatically operate and maintain the several lasting devices in positions to hold the upper upon the last and upon the inner sole during the operation of tacking the upper to the inner sole, and in these positions of the lasting devices the machine is locked out of action during the tacking of the upper all round its edges to the sole by means controlled by the treadle, which I will presently describe.

Considering now the pneumatic tacking part of the machine and the automatic operating and controlling mechanism therefor, let P designate the universally-movable tack-driving head. Q is the flexible tack-feeding tube by which the said tack-driving head is suspended. R is the tack-feeding conduit. S is the tack-containing hopper. T is the air-pump, and U is the reservoir for compressed air. All of these parts are as set forth in my said application as to their particular construction and operation, and their combination with the lasting-machine I will now describe in connection with the continuous and automatic operation of the combined machine.

Firmly secured at the back of the frame is a strong bracket V, upon which is firmly fixed a standard W, upon which is mounted a horizontal swiveling head-frame X, which carries the revolving tack-supplying hopper and tack feeding and delivering mechanism, and from which the tack-feeding tube is suspended with its universally-movable tack-driving head in position centrally over the top of the frame and the lasting devices, so that the operator standing in front of the machine can freely swing and manipulate this tack-driving head to place its tack-delivering nozzle P' at any particular point where the tack is to be driven all around the edge of the upper and drive the tacks by releasing a charge of compressed air to drive down the tack-driver $P^2$, carried within said head.

The head-supporting standard is hollow and within is supported a shaft Y, which has a bevel-pinion $a$ on its upper end, which gears with a bevel-gear $b$ of the tack-containing hopper. The lower end of this shaft has a bevel-pinion $c$, which gears with a bevel-pinion $d$, mounted in a bracket at the rear side of the frame. This pinion $d$ is driven from the main driving-shaft $e$ of the machine by a sprocket-chain connection $f$, whereby the revolving tack-containing hopper is operated. This main driving-shaft also connects with and operates the air-pump by means of a pinion $g$, which engages with a pinion $h$ on a short shaft, which, by means of a crank-pin $h'$, connects with and operates the piston of said air-pump, which supplies air to the storage-cylinder by a connecting-pipe $i$. The storage-cylinder connects by a flexible tube $j$ with the suspended tack-driving head, within which the delivery of the air-charge is controlled by means of a hand-operated valve $j'$, Fig. 7, while the air-pump T also connects with said tack-driving head by a suction-pipe $k$, Fig. 2, so that the air-power to drive the tack is produced and maintained by the operation of the main shaft $e$, which operates the lasting mechanism. The tack-driving head is composed of a tubular hand part 2, by which it is grasped and controlled in the operation of tacking, and which contains the tack-passage 3, the tack-driver passage 4, the detent 5 for the tack, and a passage 6, Fig. 8, for exhausting the air from the tack-driver passage 3. This head part is surmounted by a tack-driving piston 7, contained in a cylinder and operated by the air-charge by the valve $j$, controlled by the hand-lever 9. In this operation the operator holds the tack-driving head in his hands and places its delivery-nipple P' at the point he wishes to drive the tack, and depressing the spring-controlled lever 9 operates the valve $j'$, so that the compressed air from the valve-chest U enters the cylinder 8 above the piston 7 and instantly drives the tack which had been fed down into the driver-passage 3. This operation is repeated just as quick as the operator can change the position of the tack-driving head from one point to another around the edge of the upper, the feed of the tacks meanwhile to the driver being so timed that a tack will always be fed in position to receive the driver $P^2$ by the action of an air-charge under pressure let out at intervals.

It will be understood that when the shoe is being lasted the pump is operated to maintain the air in the reservoir under the proper compression, the reservoir being provided with a suitable pressure-gage and safety-valve.

Having thus described means and the operation for producing the air-power to drive the tacks in a machine in which the operation of both lasting and tacking is rendered automatically successive, I will now describe the means and the operation whereby such successive operations are rendered continuous by one and the same operator.

Mounted in the bearings at the rear side of the machine is the driving-shaft $e$, having upon one end a loose band-wheel $z$, by which the power is applied to the machine. Upon this shaft $e$ is a pinion $l$, which gears with a wheel $m$, fixed on the end of the cam-shaft D, at the outer side of the end of the frame. Between the pinion $l$ and the band-wheel $z$ is a clutch $n$, the sliding part of which is connected to and slides with the band-wheel and is also connected with a clutch-arm $p$, mounted in a bracket $q$ on the side of the frame, and having a horizontal branch $r$, making a bell-crank lever, which, by means of a link $s$, Fig. 4, is coupled with a treadle $t$, which is connected to a tie-rod $u$ at the rear side of the frame. On the inner face of the cam-shaft gear-wheel $m$ is fixed an annular rim $v$, having circumferential notches or shoulders $w$, Fig. 6, suitably disposed to control the several stops in the operation of the machine in unison with the action of the cams to operate the lasting devices. A slide $x$ is arranged vertically in suitable confining-guideways at the inner side of the end frame, and is provided with a horizontally-projecting stop-dog $y$, adapted to ride upon the circumference of the annular rim $v$ of the gear-wheel $m$ and to be forced into the notches $w$ of said rim as the latter revolves. For this purpose the dog-slide $x$ is connected at its lower end to the treadle by means of a link $z$, screwed into a swiveling stud $z^2$, mounted in the horizontal arm $r$ of the clutch-lever, which arm $r$ is constantly pulled up by means of a spring $z^3$ connected to the end of said arm and to the frame. In Fig. 6 I have shown the notched rim and the notches therein as being beveled at their ends approaching the dog, so that in stopping the machine the dog will enter the notch and in starting the machine the dog is withdrawn by the treadle clear of the shoulder of the notch.

The machine being at rest and all the lasting parts open, the last with the upper and the inner sole is placed upon the heel-pin of the jack B, and the operator clamps the last by closing thereon the clamps of the heel and toe carriages by means of the hand-lever H, and thus firmly clamps the last in position and locks the carriages by the action of the hand-lever and its spring-pin in the fixed gage. During this operation the machine is locked out of power by the stop-dog $y$. The operator then depresses the treadle $t$, which withdraws the stop-dog $y$ from the notch 10, engages the clutch $n$, and the machine starts. The cams now act to operate the various lasting devices in succession and complete the lasting of the shoe during the operation of the machine from the notch 10 to the notch 11 in Fig. 6. At this point the automatic stop-dog $y$ is brought into action by sliding into the notch 11 in the annular rim, which stops and locks the machine out of action. The upper is now ready to be fastened to the inner sole, and the operator taking hold of the suspended tack-driving head places its nozzle end at the points to drive the tacks all around the edges of the upper, using the compressed air which the machine had stored in the driving-power. The tacking being finished, the operator, then placing his foot upon the treadle, starts the machine, in the operation of which the lasting devices are released, and the machine is again brought to its normal position and locked by the stop-dog in the notch 10 for the removal of the lasted shoe, and the work is continued as at first, the machine lasting the upper, supplying and driving the tacks, and furnishing the air-power as such driver, all from one main driving-shaft, all under the control of one operator, using his feet to control one part, his hands to control another part, and his eyes to direct the air-driven tacks, the operation of all the parts commencing and ending as he may direct with his feet, with his hands, and with his eyes, using the machine as a single structure.

Having thus fully described the construction and combination or arrangement of the several parts of my improved combined lasting and tacking machine, its operation, and advantages, what I claim as new is—

1. In a combined lasting and tacking machine, the combination, with lasting mechanism, of the drive-shaft, a clutch-shaft mechanism for connecting and disconnecting said drive-shaft and lasting mechanism, a treadle connected to said clutch mechanism, an air pump and reservoir having a supply-connection with a suspended tack-driving head, and suitable gearing connecting the pump-piston with the clutch-shaft and the drive-shaft, whereby the revolution of the drive-shaft is caused to store the pneumatic power for driving the tacks and to simultaneously operate the lasting mechanism, substantially as described.

2. In a combined lasting and tacking machine, the combination, with lasting mechanism, of the drive-shaft, a clutch-shaft mechanism for connecting and disconnecting said drive-shaft and lasting mechanisms, a treadle connected to said clutch mechanism, a tack-feeding mechanism, suitable gearing for connecting it with said drive-shaft, an air pump and reservoir having a supply-connection with a suspended tack-driving head, and suitable gearing connecting the pump-piston with the clutch-shaft and the drive-shaft, whereby the pneumatic power-storing mechanism for driving the tacks, the mechanism for lasting the upper, and the mechanism for feeding the tacks are all operated conjointly from the drive-shaft, substantially as described.

3. In a combined lasting and tacking machine, the combination, with the main frame and the revolving drive-shaft journaled in said frame, of the lasting mechanism, the cam-shaft geared to said drive-shaft and connected to operate said lasting mechanism, the rim $v$ upon said shaft formed with the notches $w$, the clutch mechanism upon the drive-shaft, the treadle and dog mechanism engaging said rim and connected to operate said clutch mechanism, the standard upon the rear of the main frame, the tack-feeding mechanism upon said standard and geared to said drive-shaft, the pneumatic hand-controlled tack-driving mechanism suspended from said standard and above said lasting mechanism, the air-reservoir connected to said tack-driving mechanism, and the air-pump geared to said drive-shaft and connected to said reservoir, substantially as described.

4. In a combined lasting and tacking machine, the combination, with the main frame and the revolving drive-shaft journaled in said frame, of the lasting mechanism in the frame, the hand-lever for controlling the heel and toe clamps of said mechanism, the gearing between said mechanism and drive-shaft, the clutch mechanism for said gearing, the treadle connected to operate said clutch mechanism, the pneumatic hand-controlled tack-driving mechanism suspended from said frame above said lasting mechanism, and the air pump and reservoir connected to said mechanism and geared to said drive-shaft, substantially as described.

In testimony whereof I have hereunto set my hand in the presence of two subscribing witnesses.

HENRY W. DEAN.

Witnesses:
A. E. H. JOHNSON,
JAMES MUNDELL.